United States Patent [19]

Smith

[11] 4,391,410

[45] Jul. 5, 1983

[54] SPRINKLER WITH TRANSVERSELY MOUNTED SPLASH PLATE

[76] Inventor: Allan L. Smith, 26591 Road 196, Exeter, Calif. 93221

[21] Appl. No.: 248,959

[22] Filed: Mar. 30, 1981

[51] Int. Cl.³ .............................................. B05B 1/26
[52] U.S. Cl. .................................... 239/498; 239/512
[58] Field of Search ............... 239/271, 272, 498, 502, 239/505, 507, 512, 518, 524, 547, 509, 510

[56] References Cited

U.S. PATENT DOCUMENTS

| 452,081 | 5/1891 | Pierce | 239/498 |
|---|---|---|---|
| 458,607 | 9/1891 | Weiss | 239/498 X |
| 984,082 | 2/1911 | Edgerton | |
| 1,401,176 | 12/1921 | Miller et al. | 239/505 |
| 1,520,048 | 12/1924 | Baird | 239/272 |
| 2,073,187 | 3/1937 | Webb | |
| 2,563,300 | 8/1951 | Aker | 239/547 |
| 2,650,132 | 8/1953 | Reinecke | |
| 2,778,677 | 1/1957 | Gould et al. | 239/512 X |
| 2,935,266 | 5/1960 | Coleondro et al. | |
| 3,335,964 | 8/1967 | Singleton | |
| 3,403,860 | 10/1968 | Shames et al. | |
| 3,454,225 | 7/1969 | Hunter | |
| 3,815,831 | 6/1974 | Jooste | |

FOREIGN PATENT DOCUMENTS

| 596864 | 11/1925 | France | 239/512 |
|---|---|---|---|
| 1492784 | 7/1967 | France | 239/524 |

OTHER PUBLICATIONS

The "SP" Series Fan-Jet Sprinkler" of Bowsmith Irrigation Products, Inc. Shown in the Pamphlet.
The "13 B & 13 P Mist Sprays" Shown in the Advertisement.
The "Krueger Nozzle" of Krueger Enterprises, Inc. Shown in the Pamphlet.
The "Low Volume Fogger" of Perma Rain, Irrigation, Inc. Shown in the Advertisement.
The "Microjet" Shown in the Advertisement.
The "Reed Micro-Sprinkler" of Reed Irrigation Systems Shown in the Advertisement.
The "Nelson Spray-1" of Nelson Irrigation Corporation Shown in the Advertisement.
The "Gear-Jet" Sprinkler of Olson Irrigation Systems Shown in the Advertisement.

*Primary Examiner*—Andres Kashnikow
*Attorney, Agent, or Firm*—Huebner & Worrel

[57] ABSTRACT

A sprinkler having a body with a fluid receiving portion, having a cutting edge deployed to cut out a portion of a conduit during installation thereon to receive the fluid receiving portion, and an opposite fluid discharging portion; an arm mounted on the fluid discharging portion of the body; and a splash plate removably mounted on the arm in spaced relation to and in alignment with the fluid discharging portion for deflecting a fluid stream impinging thereupon from the fluid discharging portion into a predetermined pattern.

12 Claims, 11 Drawing Figures

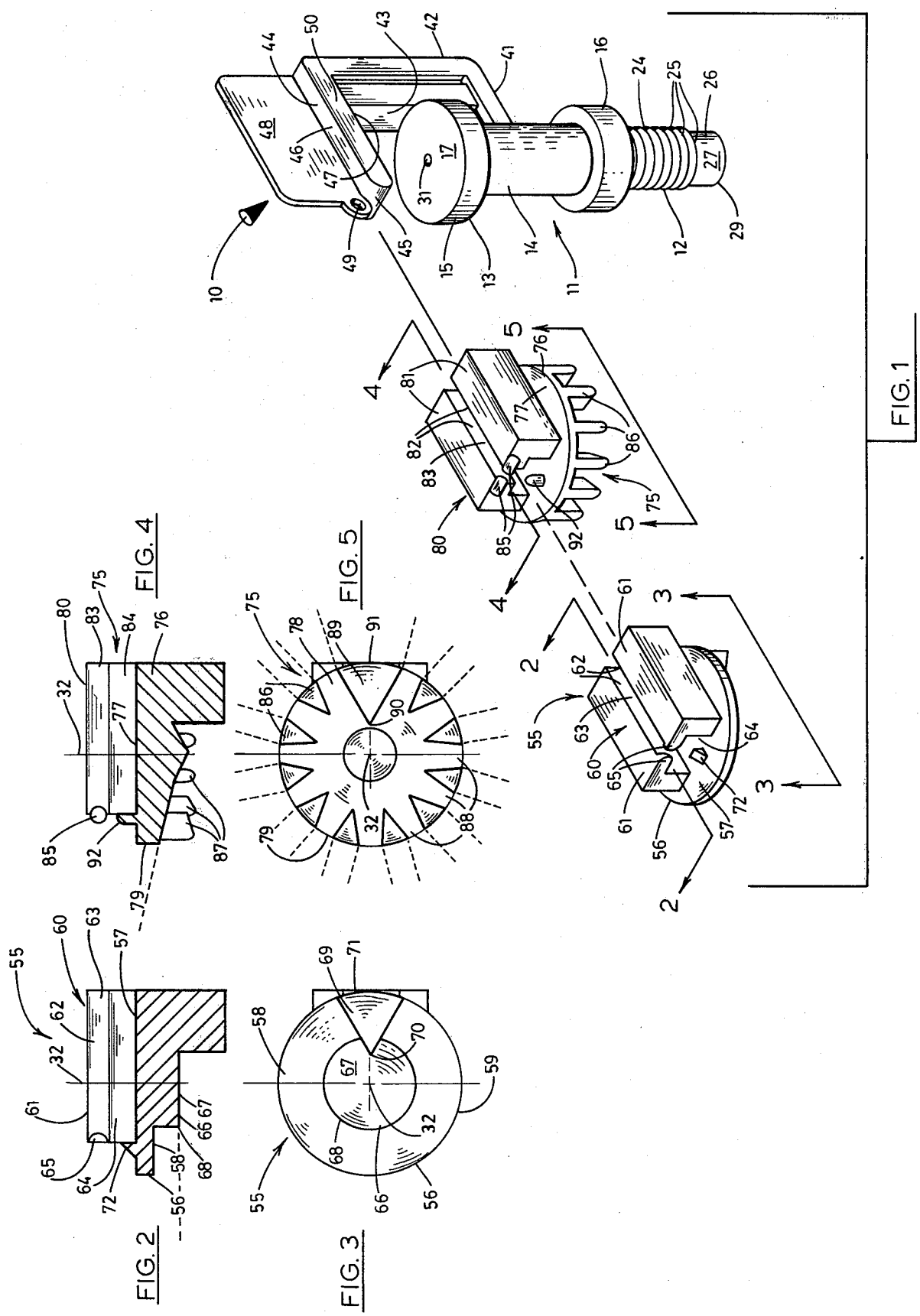

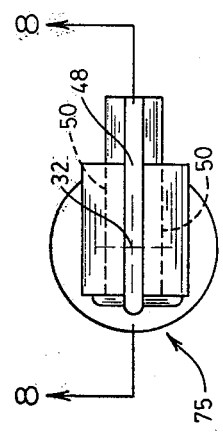
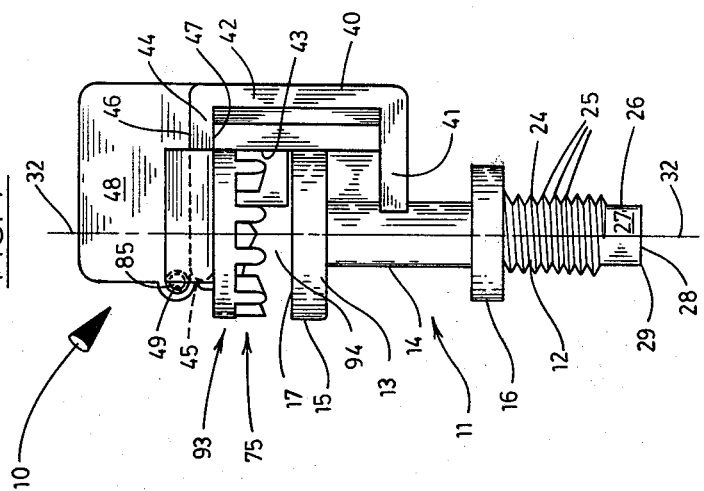
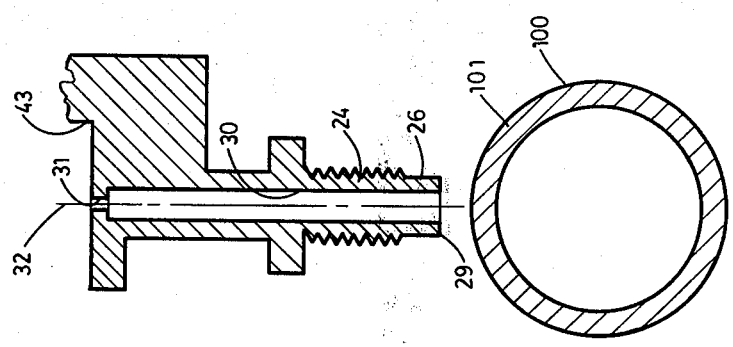
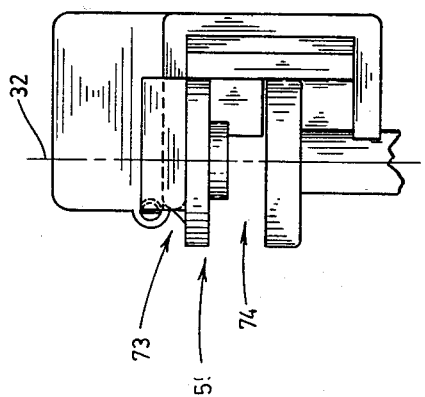
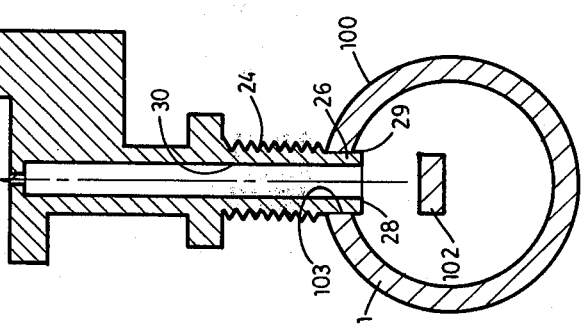
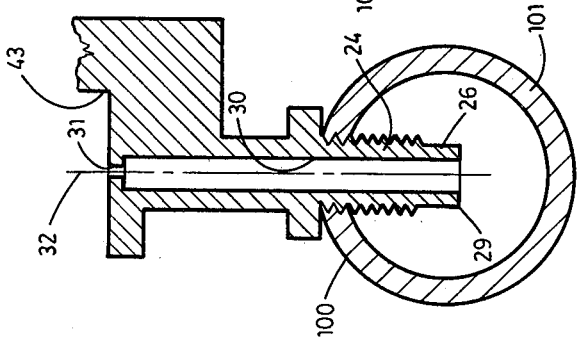

SPRINKLER WITH TRANSVERSELY MOUNTED SPLASH PLATE

BACKGROUND OF THE INVENTION

1. Field of the Invention

The present invention relates to a sprinkler and more particularly to a sprinkler which is unusually well suited to use as a sprinkler of the low volume type and which overcomes the host of problems experienced in the use of sprinklers of this type facilitating installation, minimizing operational failure and affording a high degree of versatility in use.

2. Description of the Prior Art

Sprinklers have spraying ranges and volumes correlated to the specific use intended. For illustrative convenience, sprinklers may be categorized as to range or volume varying from drip irrigation systems on the one hand which are of the smallest range and volume to huge agricultural sprinkler systems on the other hand which have immense range and volume. In recent years it has become advantageous, in order to conserve water and energy, to use a class of sprinklers referred to as "ultra low volume sprinklers". Such sprinklers commonly have a range of from six to ten feet in radius and confine irrigation to the root system of the plant involved. These sprinklers are normally supplied by an above ground system of flexible conduit such as of polyethylene.

It has been known to install sprinklers of this type by puncturing the wall of the conduit and then screw threading the sprinkler into the conduit to mount the sprinkler in position thereon. This has been accomplished both through the use of a special tool as well as by manufacturing the sprinkler with an oblique, sharpened end. In both instances, however, the wall of the conduit is punctured. Such puncturing of the conduit wall creates considerable stress within the wall and frequently causes splitting of the wall either immediately upon installation or after a period of use. Such splitting, of course, renders the system useless thus requiring replacement of sections of conduit.

Other problems inherent in the use of such sprinklers include the tendency for the splash plates of the sprinklers eventually to be blown from the sprinkler under the force of the fluid stream discharged thereagainst. Furthermore, there has been considerable difficulty caused by clogging of the sprinklers due to their extremely small size. There is, for example, a tendency for insects and the like to collect in the sprinkler when not in use. Clogging can also be caused by impurities contained in the water. A still further impediment to the use of such sprinklers resides in the inability to replace worn parts without replacing the entire sprinkler.

Therefore, it has long been known that it would be desirable to have an improved sprinkler which facilitates installation without damage to the supply system, which minimizes the possibility for failure during use, and which affords a versatility in use permitting worn parts to be replaced and operational effects to be modified without otherwise departing from the operational benefits thereof.

SUMMARY OF THE INVENTION

Therefore, it is an object of the present invention to provide an improved sprinkler which is particularly well suited to use as a sprinkler of the ultra low volume type.

Another object is to provide such a sprinkler which possesses a dependability and versatility in use to a degree not heretofore achieved in the prior art.

Another object is to provide such a sprinkler which can be installed on a supply conduit without the use of any tool other than the sprinkler itself and which is installed in a manner such as not to cause splitting of the conduit.

Another object is to provide such a sprinkler which is so designed as to free itself of extraneous materials when the system to which it is attached is pressurized so as to reduce the possibility of clogging to an absolute minimum.

Another object is to provide such a sprinkler which precludes portions thereof from being blown from the sprinkler under the force of water discharged thereagainst.

Another object is to provide such a sprinkler which permits the replacement of the fluid deflecting portions of the sprinkler for the purpose of replacing worn parts as well as for the purpose of permitting the sprinkler to be adjusted to define spray patterns of different selected configurations.

Another object is to provide such a sprinkler which can be adjusted to define a spray pattern most suited to the growth of a particular plant on which it is used permitting the size of the spray pattern to be enlarged as the root system of the plant enlarges.

Another object is to provide such a sprinkler which employs a splash plate operable to form a stable, film-like spray pattern of relatively small diameter.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is an enlarged prespective view of the sprinkler of the present invention showing the first and second splash plates thereof removed from the sprinkler for illustrative convenience.

FIG. 2 is a vertical section of the first splash plate taken on line 2—2 in FIG. 1 and showing the path of the fluid stream in dashed lines.

FIG. 3 is a bottom plan view of the first splash plate taken on line 3—3 in FIG. 1.

FIG. 4 is a vertical section of the second splash plate taken on line 4—4 in FIG. 1 and showing the path of the fluid stream in dashed lines.

FIG. 5 is a bottom plan view of the second splash plate taken on line 5—5 in FIG. 1 and showing the path of the fluid stream in dashed lines.

FIG. 6 is a side elevation of the sprinkler with the second splash plate mounted in the operating position thereon.

FIG. 7 is a top plan view of the sprinkler of FIG. 6.

FIG. 8 is a fragmentary vertical section taken on line 8—8 in FIG. 7 and showing the sprinkler in position for installation on a conduit.

FIG. 9 is a fragmentary vertical section showing the sprinkler of FIG. 8 in an intermediate position having been forced into the conduit to shear a portion of the conduit therefrom.

FIG. 10 is a fragmentary vertical section showing the sprinkler of FIGS. 8 and 9 in an installed position on the conduit.

FIG. 11 is a fragmentary side elevation of the sprinkler with the first splash plate mounted in the operating position thereon.

DESCRIPTION OF THE PREFERRED EMBODIMENT

Referring more particularly to the drawings, the sprinkler of the present invention is generally indicated by the numeral 10 in FIG. 1. The sprinkler is preferably constructed of a molded, durable plastic material, such as thermoplastic acetal. The sprinkler has a body 11 which is preferably a single molded piece. The body has a fluid receiving portion 12 and an opposite fluid discharging portion 13. The body has a cylindrical portion 14 bounded by an upper plate 15 and an opposite lower plate 16. The plates are disposed normally to the cylindrical portion. The upper plate 15 has a substantially flat upper surface 17.

The fluid receiving portion 12 of the body 11 has a first segment or shaft 24 extending axially from the lower plate 16. The first segment has external screw threads 25 extending thereabout. A second segment or shank 26 is axially extended from the first segment 24 and is of a smaller diameter than the first segment. The second segment has a smooth outer cylindrical surface 27 which terminates in an end surface 28. The end surface 28 is preferably flat and right-angularly related to the second segment. The end surface joins the outer cylindrical surface in right angular relation thereby to form a cutting edge 29 extending peripherally about the end surface. The cutting edge is sufficiently sharp to cause a cutting or shearing action when forced into the wall of a perforable conduit such as one formed from polyethylene. It has been found, however, that the edge need not be of any material other than that which the body 11 of the sprinkler 10 is fabricated; that is, in the preferred embodiment, thermoplastic acetal. Similarly, it has been found that while the cutting edge should be sufficiently sharp to perform the cutting operation hereinafter to be described, this effect is achieved where the cutting edge is of a sharply right angular or substantially right angular configuration. Thus, the cutting edge need not be sharpened in the sense of a knife blade or the like.

A fluid passage 30 extends axially of the body 11 extending through the end surface 28 of the shank 26 to a position just inwardly of the upper surface 17 of the upper plate 15, as best shown in FIGS. 8, 9 and 10. The fluid passage communicates with the exterior of the fluid discharging portion 13 through an orifice 31. The passage and orifice are concentric to an axis 32 shown in FIGS. 2 through 11 for illustrative convenience. When the sprinkler is pressurized, a fluid stream is discharged from the orifice along a path extending along the axis 32.

An arm 40 is mounted on the fluid discharging portion 13 of the body 11 and is preferably formed as an integral part of the body such as by molding the arm and body as an integral unit. The arm has a mounting portion 41 which is borne on the fluid discharging portion 13 beneath the upper plate 15, as best shown in FIGS. 1 and 6. The arm has an upright portion 42 substantially right angularly related to the mounting portion and laterally disposed with respect to the orifice 31 of the upper plate 15. The upright portion has an inner surface 43 which is preferably substantially right-angularly related to the upper surface 17 of the upper plate 15 and faces in the direction of the upper surface. The arm has a track portion 44 right-angularly related to the upright portion 42 and extending substantially parallel to the upper surface 17 of the upper plate 15 in substantially right angular relation to and intersecting the axis 32. The track portion has a terminal end 45 which extends to a point beyond the axis 32 from the upright portion. The track portion has an upper surface 46 and an opposite substantially parallel lower surface 47. A flange plate 48 is mounted on the upper surface 46 of the track portion extending longitudinally therealong substantially centrally thereof, as best shown in FIG. 7. A hole 49 is formed in a portion of the flange plate immediately above the terminal end 45 of the track portion 44. The central location of the flange plate on the upper surface 46 leaves shoulders 50 on opposite sides of the flange plate.

The sprinkler 10 has a first splash plate 55, shown in FIGS. 1, 2, 3 and 11. The first splash plate is preferably of one piece, molded construction. The first splash plate has a substantially flat central portion 56 having an upper surface 57 and an opposite lower surface 58. The lower surface can be flat or provide an inverted cone-like configuration centrally thereof. The central portion has a peripheral edge 59. A mount 60 is borne by the upper surface 57 of the central portion and is composed of a pair of juxtaposed guide plates 61. The guide plates have juxtaposed, parallel edges 62 defining a slot 63 therebetween. The guide plates enclose a passage 64 extending therebetween and communicating with the slot 63, as best shown in FIG. 1. The guide plates individually mount pins 65 in position for snap fitted engagement with the hole 49 of the flange plate 48 as will hereinafter be described. As shown in FIGS. 1 and 2 the pins are preferably "D" shaped in cross section to provide more resistance to displacement from snap fitted engagement as a result of the flat surfaces thereof. For this type of pin, the hole 49 can, alternatively, also be "D" shaped to offer still further resistance to displacement. Conversely, the pins and hole can be as shown in FIGS. 1 and 4 with respect to the second splash plate hereinafter to be described.

A deflection pad 66 is mounted on the lower surface 58 of the central portion 56 of the first splash plate 55. The deflection pad has a contact surface 67 which is substantially parallel to the upper and lower surfaces 57 and 58. The contact surface 67 has a right angular peripheral edge 68 bounding the surface.

A diversion member 69 is secured on the lower surface 58 of the central portion 56 and extends a short distance onto the deflection pad 66, as shown in FIG. 3. The diversion member is preferably triangular in cross section and has a leading edge 70 and an opposite trailing surface 71 which is preferably of substantially the same width as the inner surface 43 of the arm 40.

A stop 72 is mounted on the upper surface 57 of the central portion 56 in position to abut the terminal end 45 of the track portion when the pins 65 are snap fitted in the hole 49 of the flange plate 48, as will hereinafter be described.

The first splash plate 55 is adapted to be slidably mounted on the track portion 44 of the arm. This is accomplished by inserting the track portion in the passage 64 of the mount 60, as shown in FIG. 11, with the flange plate 48 extending through the slot 63 between the juxtaposed edges 62. Thus, the splash plate is slidable along the track portion to an operating position 73 shown in FIG. 11. When the first splash plate is disposed in the operating position, the pins 65 snap into the hole 49 and the stop 72 abuts the terminal end of the track portion to retain the splash plate in the operating position. It will be seen that the path of movement of the splash plate to and from the operating position is along a path substantially right angularly related to the axis 32 of the fluid passage 30. The stop 72 serves the additional purpose of preventing the splash plate from being installed backwards on the track portion. For purposes of illustrative convenience, it will be understood that the area between the splash plate and the upper surface 17 of the upper plate 15 is a zone 74.

The sprinkler 10 has a second splash plate 75 shown in FIGS. 1, 4, 5, 6, and 7. The second splash plate is also preferably of one piece, molded construction. The second splash plate has a substantially flat central portion 76 having an upper surface 77 and an opposite lower surface 78. The lower surface can be flat or provide an inverted cone-like configuration centrally thereof. The central portion has a peripheral edge 79. A mount 80 is integrally provided on the upper surface 77 of the central portion and is composed of a pair of juxtaposed guide plates 81. The guide plates have juxtaposed, parallel edges 82 defining a slot 83 therebetween. The guide plates enclose a passage 84 communicating with the slot 83, as best shown in FIG. 1. The guide plates individually mount pins 85 in position for snap fitted engagement with the hole 49 of the flange plate 48 of the arm 40.

A plurality of fingers or vanes 86 are mounted on the lower surface 78 of the central portion 76 extending around the peripheral edge 79 thereof in individually spaced and substantially parallel relation substantially normal to the upper surface 77 of the central portion 76. The vanes extend to terminal ends 87 and are spaced from each other to form interstices 88 between the vanes. A diversion member 89 is mounted on the lower surface 78 of the central portion 76. The diversion member is preferably triangular in cross section and has a leading edge 90 and an opposite trailing surface 91 which is perferably of substantially the same width as the inner surface 43 of the arm 40. A stop 92 is mounted on the upper surface 77 of the central portion 76 in position to abut the terminal end 45 of the track portion when the pins 85 are snap fitted in the hole 49 and the second splash plate is in the operating position 93 shown in FIG. 6.

The second splash plate 75 is adapted to be slidably mounted on the track portion 44 of the arm with the track portion received in the passage 84 and the flange plate 48 extending through the slot 83 between the juxtaposed edges 82 of the mount 80. Thus, the second splash plate is movable along the track portion to and from the operating position 93, as shown in FIG. 6. For purposes of illustrative convenience, it will be understood that the space between the second splash plate and the upper surface 17 is a zone 94.

OPERATION

The operation of the described embodiment of the subject invention is believed to be clearly apparent and is briefly summarized at this point. For illustrative convenience, a conduit 100, preferably fabricated from polyethylene or the like, is shown in FIGS. 8 through 10 in cross section. The conduit has a perforable side wall 101. It will be understood that the sprinkler 10 of the present invention can be mounted on conduit of any suitable type including conduit not perforable in the manner hereinafter described. In such case, the screw threads 25 of the body 11 are simply screw-threadably mounted in mating screw threads provided on the conduit for the purpose.

However, the sprinkler is preferably mounted on a perforable conduit 100. This is achieved by grasping the body 11 of the sprinkler and forcing the cutting edge 29 of the cylindrical shank 26 into the side wall 101 of the conduit. It has been found that this action achieves a shearing of a portion of the side wall 101 of the conduit by the cutting edge. This action cuts a plug or pellet 102 of about the same diameter as the cylindrical shank 26 from the side wall of the conduit. The pellet is forced inwardly of the conduit and a hole 103 is thus formed within the side wall of the conduit. Subsequently, the sprinkler is installed by screw threading the screw threads 25 of the shaft 24 into the hole 103 in the side wall until the lower plate 16 abuts the outer surface of the side wall 101 securely to mount the sprinkler in upstanding position on the conduit. The sprinkler can be adjusted to face in the desired direction by grasping the flange plate 48. Thus, a plurality of the sprinklers 10 can be mounted on a conduit in any desired positions without need for the use of auxiliary tools and achieving in each case a water tight and secure installation. Furthermore, it has been found that by removal of the pellet during the installation operation, the side wall of the conduit is not placed under such stress as occurs when the side wall is simply punctured as is conventionally done. Thus, splitting of the side wall of the conduit is avoided. The pellets so formed within the conduit are flushed from the conduit by pressurization of the line prior to sealing of the system. Thus, there is no risk of clogging the sprinklers with the pellets.

Once the sprinklers 10 are installed as described, the system can be pressurized when desired to be placed in operation. With relatively smaller plants, it is normally desired that the first splash plate 55 be employed when installed as previously described since the spray pattern so formed is of generally smaller diameter than the spray pattern formed by the second splash plate 75. As can best be visualized in FIGS. 2, 3 and 11, pressurization of the system causes water under pressure to pass upwardly through the fluid passage 30 and to be discharged through the orifice 31 against the contact surface 67 of the deflection pad 66. The water is diverted by the deflection pad along a course as shown in FIG. 2 to form a stable, film-like spray pattern extending to a radius of approximately six feet thereby watering a relatively smaller area than the second splash plate 75. The film-like spray pattern is contiguous and is stable in the sense that it does not oscillate up and down. This effect has been found to result from the small surface area of the deflection pad. Consequently, a more even and thorough soaking of a relatively smaller area is achieved thereby reducing water loss due to evaporation. The diversion member 69 operates to divert the spray pattern flowing in the direction of the upright portion 42 of the arm 40 about the arm 40 so as not to cause rebounding of the spray off of the inner surface 43 of the upright portion and thus create turbulence within the zone 74.

It will be seen that the splash plates 55 and 75 can be replaced when they become worn simply by pulling each splash plate along its respective track portion from the upright portion 42 to disengage the pins 65 and 85 respectively from the hole 49 and remove the splash plate from the sprinkler. Subsequently, a new splash plate can be installed.

When it is desired to modify the sprinkler 10 for the formation of a different spray pattern, this can be achieved in substantially the same way. Where the first splash plate 55 has been removed, the second splash plate 75 can be inserted with the track portion 45 received in the passage 84 and the splash plate slidably moved along the track portion until the pins 85 engage the hole 49 to position the second splash plate in the operating position 93 shown in FIG. 6. Pressurization of the sprinkler 10 through the system causes a fluid stream to be discharged from the orifice 31 against the lower surface 78 of the second splash plate and thereby to divert the fluid stream radially therefrom at right angles. The vanes 86 direct the fluid stream into the interstices 88 between the vanes thereby forming jets of water individual to the interstices as can best be visualized in FIG. 5. This imparts greater velocity to the water and causes greater droplet size and correspondingly increases the radius of the spray pattern so formed relative to that of the first splash plate 55. The radius is normally about ten feet. As with the first splash plate, the diversion member 89 directs the fluid stream about the upright portion 42 of the arm 40 so as not to create turbulence within the zone 94. The jets of water initially individually swell upon leaving their respective interstices, but quickly narrow so that the jets remain discrete from each other throughout their paths.

Other types of splash plates, having mounts such as mounts 60 and 80 but creating different spray patterns, can be mounted on the sprinkler without departing from the invention. The splash plates 55 and 75 are representative of only two such splash plates.

Since the track portion 44 of the arm 40 is right-angularly related to the path of the fluid stream discharged from the orifice, the splash plates cannot be blown from the sprinklers by the fluid stream impinging thereupon.

Should a sprinkler 10 require replacement, this is accomplished simply by screw-threadably removing the shaft 24 from the hole 103 and replacing the sprinkler with a new sprinkler as previously described. Such installation and adjustment of the sprinklers is facilitated by the flange plate 48 which provides a grasping portion for purposes of turning the sprinkler.

Furthermore, it will be seen, as viewed in FIGS. 6 and 11, that the zones 74 and 94 of the splash plates 55 and 75 respectively are substantially free of obstruction. Thus insects, spiders and the like crawling into these zones will not clog the sprinklers when the systems are pressurized but will simply be blown from the zones upon such pressurization. Similarly, impurities passing along the fluid passage 30 and from the orifice 31 are free to pass from the sprinkler without being trapped in confined areas within these zones.

Therefore, the present invention provides a sprinkler which is thoroughly dependable and versatile permitting installation without the use of auxiliary tools and without creating conditions which may cause failure as is characteristic of conventional sprinklers while providing the capability for replacing worn parts and adjusting the operation of the sprinkler to suit the operating characteristics desired.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A sprinkler comprising a body having a fluid passage extending therethrough and communicating with the exterior thereof for the release of a fluid stream therefrom substantially along a predetermined axis, an arm mounted on the body having a portion defining a track disposed in substantially right angular relation to said axis, a splash plate having a predetermined impact point for contact by said fluid stream when the splash plate is in an operating position and a mount engageable with the portion of the arm defining the track for movement of the splash plate along the track to carry said impact point along a path substantially intersecting said axis, and means for interlocking the splash plate and the arm in fixed position relative to each other when said impact point is in substantial coincidence with said axis.

2. The sprinkler of claim 1 wherein said interlocking means includes portions borne by the arm and the splash plate adapted for snap fitted engagement when the splash plate reaches said operating position during said movement of the splash plate along the track.

3. The sprinkler of claim 1 wherein contact of the fluid stream on the impact point of the splash plate forms a spray pattern, the arm has a portion interconnecting the body and the portion of the arm defining the track, and a member is mounted on the splash plate in a position to extend in juxtaposition to said interconnecting portion when the splash plate is in said operating position and between the interconnecting portion of the arm and said axis to deflect fluid about the interconnecting portion of the arm in such a manner as to minimize disruption of said spray pattern.

4. The sprinkler of claim 1 wherein the splash plate mounts a plurality of vanes thereon spaced from each other and substantially equidistant from said impact point, said vanes having substantially blade-like edges nearest the impact point and substantially parallel to said axis when the splash plate is in said operating position.

5. The sprinkler of claim 4 wherein the impact point of the splash plate forms the apex of a substantially conical surface extending from said apex and to said blade-like edges of the vanes forming acute angles with respect thereto.

6. A sprinkler for forming a predetermined spray pattern comprising:
A. a body having a mounting portion, an opposite discharge portion and a fluid passage extending through the body from the mounting portion to the discharge portion and communicating with the exterior of the body in the discharge portion through an orifice adapted to release fluid under pressure therefrom in a fluid jet substantially along a predetermined path;
B. an arm mounted on the body having a first portion extending endwardly from the discharge portion off set relative to said predetermined path and a second portion extending through said predetermined path in substantially right angular relation thereto and in spaced relation to the orifice and having oppositely extending shoulders;
C. a splash plate having a mount with a passage therein dimensioned to receive the shoulders of the second portion of the arm to permit sliding movement of the mount along said second portion of the arm for moving the splash plate to an operating position, a predetermined fluid jet contact position thereon for impingement thereagainst by said fluid jet when the splash plate is in said operating position, and a plurality of fluid vanes spaced from each other and having substantially blade-like edges facing and substantially equidistant from said contact position, said blade-like edges being substantially parallel to the predetermined path of the fluid jet when the splash plate is in said operating position; and D. means borne by the splash plate and the arm for releasably interlocking when the splash plate reaches said operating position substantially precisely to position said contact position thereof and the vanes relative to the predetermined path of the fluid jet to form said predetermined spray pattern.

7. The sprinkler of claim 6 wherein said predetermined spray pattern is composed of substantially discrete, radially projecting fluid streams and the vanes are substantially wedge-shaped in cross section extending from their respective blade-like edges to separate fluid impinging on said contact position and radially deflected thereby against the vanes into substantially discrete fluid streams individually formed by passage between adjoining vanes.

8. A sprinkler adapted to form a predetermined spray pattern comprising a body having a fluid passage extending therethrough and communicating with the exterior thereof for the release of a fluid stream therefrom substantially along a predetermined axis, an arm mounted on the body having a plate mounting portion disposed in substantially right angular relation to said axis, a plate having a surface for contact by said fluid stream when the plate is in an operating position and a mount engageable with said plate mounting portion of the arm for movement of the plate along the plate mounting portion to carry said surface along a path substantially intersecting said axis, and means for terminating said movement of the plate along the mounting portion of the arm and fixing said plate relative thereto when said surface is in substantial alignment with said axis whereby said fluid stream directed against the surface forms said spray pattern.

9. The sprinkler of claim 8 wherein said surface of the plate has a predetermined impact point for contact by said fluid stream when the plate is in said operating position and said terminating means terminates said movement of the plate along the mounting portion of the arm and fixes the plate thereto when said impact point is in substantial coincidence with said axis of the fluid stream.

10. The sprinkler of claim 8 wherein the arm has an interconnecting portion extending between the plate mounting portion of the arm and the body of the sprinkler and a member is mounted on a side of the plate having the surface and in position to extend in juxtaposition to said interconnecting portion of the arm when the plate is in said operating position to divert fluid about the interconnecting portion of the arm so as to minimize disruption of said spray pattern.

11. The sprinkler of claim 8 wherein a plurality of vanes are mounted on a side of the plate having said surface spaced from each other and having blade-like edges facing said surface with portions thereof substantially parallel to said axis of the fluid stream when the plate is in said operating position.

12. The sprinkler of claim 8 for installation on a perforable conduit wherein said body has a fluid receiving portion remote from the plate mounting portion of the arm with a cutting edge circumscribing the distal end of said fluid receiving portion to cut a hole in the perforable conduit by removing a portion thereof to receive the fluid receiving portion of the body.

* * * * *